United States Patent [19]
Baird

[11] Patent Number: 5,407,158
[45] Date of Patent: Apr. 18, 1995

[54] BEVERAGE HOLDER DEVICE FOR USE IN VEHICLES

[76] Inventor: Gary D. Baird, 27031 125th Ave. SE., Kent, Wash. 98031

[21] Appl. No.: 174,780

[22] Filed: Dec. 29, 1993

[51] Int. Cl.$^6$ ............................................. A45D 42/14
[52] U.S. Cl. ............................... 248/205.5; 248/224.4; 248/274; 248/313; 224/42.45 R; 224/42.46 R
[58] Field of Search ............................ 224/42.46, 42.45; 248/205.5, 312, 312.1, 284, 313, 297.2, 316.1, 223.4, 274, 224.4

[56] References Cited

U.S. PATENT DOCUMENTS

| | | | |
|---|---|---|---|
| 1,533,136 | 4/1925 | Phelps | 248/205 S |
| 1,575,789 | 3/1926 | Phelps | 248/205.5 |
| 1,751,463 | 3/1930 | Backun et al. | 224/42.45 R |
| 2,926,828 | 3/1960 | Kuddie | 224/42.46 R |
| 2,994,438 | 8/1961 | Nelson | 248/312.1 |
| 3,508,732 | 4/1970 | Trachtenberg et al. | 224/42.45 R |
| 4,071,174 | 1/1978 | Weiner | 224/277 |
| 4,613,135 | 9/1986 | Rush | 248/223.4 |
| 4,629,153 | 12/1986 | Marcum | 224/42.45 R |
| 5,058,787 | 10/1991 | Chou | 224/42.46 R |
| 5,071,096 | 12/1991 | Hartman et al. | . |
| 5,149,032 | 9/1992 | Jones et al. | 248/313 |

*Primary Examiner*—Alvin C. Chin-Shue
*Assistant Examiner*—Korie H. Chan

[57] ABSTRACT

A beverage holding device attachable to the windshield of a vehicle; the device comprises a semi-circular beverage holder ting having an open region and affixed to a linearly and axially adjusting armature. The armature is accepted in the tongue-in-groove channel of an adjusting retainer that is molded around a rubber suction cup for means of installation. On installation, the beverage holder ring rests horizontally with and slightly above the dashboard surface. The device, in conjunction with a vehicle's windshield and its dashboard surface, comprises the means for retaining a beverage when a beverage is placed on a vehicle's dashboard surface and within the circumference of the beverage holder ring.

1 Claim, 1 Drawing Sheet

BEVERAGE HOLDER DEVICE FOR USE IN VEHICLES

BACKGROUND OF THE INVENTION

1. Field of the Invention

The present invention relates generally to the secure retention and stabilization of beverage containers especially for use in stationary or moving vehicles.

2. Background Art

Beverage holders, primarily for use in vehicles, exist in a plurality of forms and functions. Such beverage holders contain a beverage in its entirety utilizing a base and retainer walls or legs. The present beverage holder merely stabilizes a beverage container while utilizing a vehicle's dashboard as the beverage holder base.

There have been prior art teachings of beverage holders with a plurality of stabilizing means. U.S. Pat. No. 5,149,032 to Jones et al. dated Sep. 22, 1992, attaches to a vehicle interior by means of a stabilizing leg which is wedged between the seat and back cushions of said vehicle. This method does not contemplate passengers riding in said vehicle or various shapes of vehicle seats. U.S. Pat. No. 5,071,096 to Hartman et al. dated Dec. 10, 1991, contemplates a stabilizing device for a drink container using a broad base housing which rests on a surface such as the dashboard or seat of a vehicle interior. This method fails to contemplate the conditions in a moving vehicle such as swift acceleration and deceleration which may cause the stabilizing device to slide or tip from its location.

Other prior art devices contemplate a plurality of attachment methods including attachment to a vehicle's cigarette lighter, hangar type attachment to a vehicle door and adhesive backed attachment to a vehicle dashboard or other surface.

SUMMARY OF THE INVENTION

The present invention is concerned with providing a beverage holding device for adequately retaining and stabilizing a beverage container in a moving vehicle and which contemplates the use of said vehicle's dashboard as the base for the beverage holding device.

It is an object of the invention to provide a beverage holder for vehicles that mounts directly to the vehicle windshield.

Another object of the invention is to utilize the vehicle dashboard as the beverage container's base.

Yet another object of the invention is to provide an adjustable armature that will adapt to most flat and semi-flat dashboard surfaces.

A further object of the invention is to provide a means of retaining a beverage in a vehicle without modification to the vehicle's interior.

Still another object of the invention is to provide a beverage holder for a variety of beverage sizes.

Another object of the invention is to provide a beverage holding means without permanent installation attachments.

BRIEF DESCRIPTION OF THE DRAWINGS

The present invention will be more fully understood by reference to the following detailed description thereof when read in conjunction with the attached drawings, and wherein.

DETAILED DESCRIPTION OF THE DRAWINGS

Figure 1:
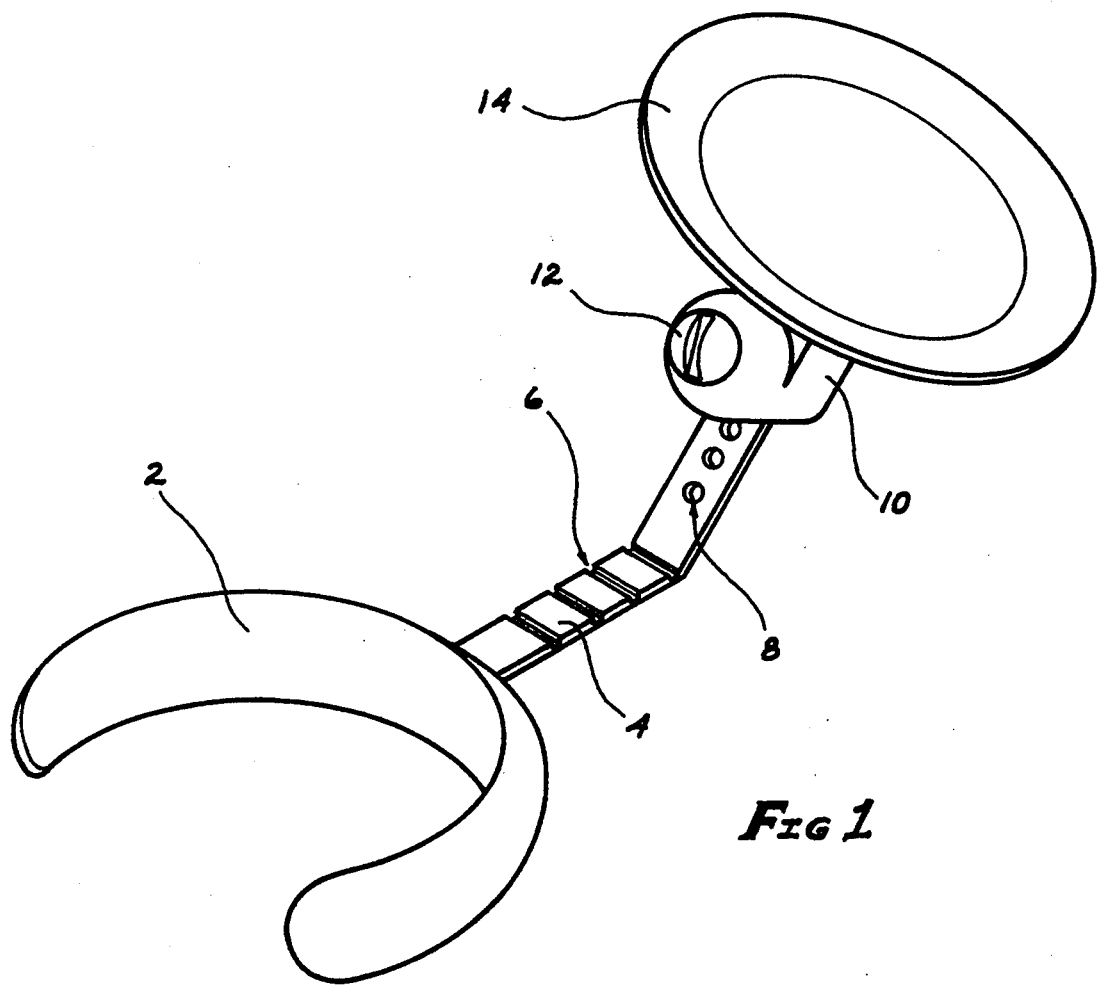
FIG. 1 is a perspective view of the beverage holder apparatus which embodies the present invention.
Figure 2:
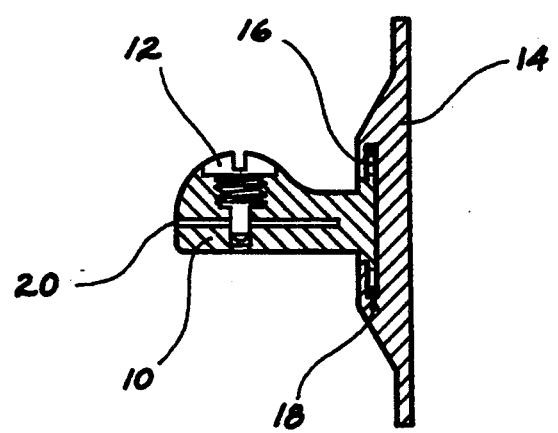
FIG. 2 is a sectional view illustrating the design characteristics of the adjustable plastic retainer and suction cup assembly.

While this invention is susceptible of embodiment in a plurality of forms, there is shown in the drawings and will herein be described in detail one specific embodiment with the understanding that the present disclosure is to be considered as an exemplification of the principles of the invention and is not intended to limit the invention to the embodiment illustrated.

Referring to the drawings, it is seen that the device of the present invention comprises a beverage holder ring (2), an adjustable armature (4), an adjusting retainer (10) having a channel (20), a screw-in lock pin (12) and a suction cup (14) for attachment to a vehicle's windshield.

The beverage holder ring (2) may be made of a suitable injection moldable plastic material. The armature (4) will be positioned in the beverage holder ring (2) mold during the injection molding process.

The adjusting retainer (10) and the screw-in lock pin (12) may also be made of a suitable injection moldable plastic material.

The suction cup (14) may be made of a robber material and injection molded around the flange (18) of the adjusting retainer (10) to maintain a secure fit around the retainer flange (18) and through holes (16) located on the flange (18).

The armature (4) may be made of a suitable material such as stainless steel so as to maintain rigidity, yet be easily pliable at the notched junctures (6) for manual adjustments at installation. The armature (4) will contain incrementally spaced position holes (8) which is inserted into the channel (20) for lock pin (12) penetration during installation adjustments.

The means for installation and the use of the present invention is described as follows:

The armature (4) and the beverage holder ring (2) will be fabricated as one assembly. The retainer (10), lock pin (12) and the suction cup (14) will be fabricated as a separate assembly.

The invention will be installed as such:

The suction cup assembly (10), (12) and (14) will be pressed onto the vehicle windshield just above the vehicle's dashboard. The beverage holder assembly (2) and (4) will be inserted into the suction cup assembly (10), (12) and (14) to the desired position hole (8) location and the lock pin (12) will be rotated into place so as to penetrate the armature (4) at the desired position hole (8) thereby securing the armature (4) in the desired location.

The final step in the installation process will be to manually bend the armature (4) at one or more notched junctures (6) that best suits the dashboard's contour until the beverage holder ring (2) is horizontal to the dashboard surface.

The use of the present invention will be as such:

The beverage holder ring (2) will rest slightly above the surface of a vehicle's dashboard. A beverage container will be pressed onto the open portion of the beverage holder ring (2) as the beverage container is placed on the dashboard surface.

What is claimed is:

1. A beverage retaining device for mounting onto a windshield of a vehicle, the beverage retaining device comprising:
   (a) a beverage holder ring of a semi-circular configuration, thereby having an open region, the open region of the beverage holder ring is such that the holder ring frictionally accept a plurality of beverage container sizes whose diameters are greater than the open region of the beverage holder ring when the beverage containers are pressed through the open region of the beverage holder ring;
   (b) an elongate adjustable armature attached to the holder ring, said adjustable armature having along a longitudinal axis thereof a plurality of spaced apart holes and a plurality of notched junctures to facilitate bending of the armature;
   (c) an adjusting retainer having a channel for receiving the armature;
   (d) a screw-in lock pin positioned on said adjusting retainer and being in communication with said channel for penetration through a preferred one of said holes of the armature when the armature is inserted through the channel of the adjusting retainer for securing the armature to the adjusting retainer;
   (e) a suction cup connected to said adjusting retainer for mounting the beverage retaining device onto the windshield of the vehicle.

* * * * *